US008227134B2

(12) United States Patent
Leddy et al.

(10) Patent No.: US 8,227,134 B2
(45) Date of Patent: Jul. 24, 2012

(54) SELF-HYDRATING MEMBRANE ELECTRODE ASSEMBLIES FOR FUEL CELLS

(75) Inventors: Johna Leddy, Iowa City, IA (US); Wayne L. Gellett, Iowa City, IA (US); Drew C. Dunwoody, N. Liberty, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/684,802

(22) Filed: Oct. 15, 2003

(65) Prior Publication Data

US 2005/0084741 A1 Apr. 21, 2005

(51) Int. Cl.
*H01M 8/10* (2006.01)
(52) U.S. Cl. ........ 429/483; 429/492; 429/523; 429/534; 429/450
(58) Field of Classification Search .................... 429/30, 429/34, 40, 41, 42, 44, 33, 10; 502/4, 101; 204/282, 295, 297.01
See application file for complete search history.

(56) References Cited

U.S. PATENT DOCUMENTS

| | | | | |
|---|---|---|---|---|
| 4,680,140 | A | 7/1987 | Kageyama | 252/512 |
| 4,826,741 | A | 5/1989 | Aldhart et al. | |
| 5,242,764 | A | 9/1993 | Dhar | 429/30 |
| 5,318,863 | A | 6/1994 | Dhar | 429/30 |
| 5,441,819 | A * | 8/1995 | Voss et al. | 429/13 |
| 5,503,944 | A | 4/1996 | Meyer et al. | |
| 5,521,020 | A | 5/1996 | Dhar | 429/142 |
| 5,786,040 | A | 7/1998 | Leddy et al. | 427/598 |
| 5,817,221 | A | 10/1998 | Leddy et al. | 204/290 R |
| 5,871,625 | A | 2/1999 | Leddy et al. | 204/290 R |
| 5,928,804 | A | 7/1999 | Leddy et al. | 429/10 |
| 5,981,095 | A | 11/1999 | Leddy et al. | 429/13 |
| 6,001,248 | A | 12/1999 | Leddy et al. | 210/222 |
| 6,207,312 | B1 | 3/2001 | Wynne et al. | 429/34 |
| 6,355,166 | B1 | 3/2002 | Amarasinghe et al. | 210/223 |
| 6,576,267 | B2 | 6/2003 | Gelber et al. | 424/725 |
| 2004/0241531 | A1 * | 12/2004 | Biegert et al. | 429/44 |

FOREIGN PATENT DOCUMENTS

| | | |
|---|---|---|
| EP | 0589535 A1 | 3/1994 |
| EP | 0589535 B1 | 3/1998 |
| EP | 0853994 A1 | 7/1998 |
| JP | 59023801 A | 2/1984 |
| JP | 08259847 A | 8/1996 |
| WO | WO97/33713 | 9/1997 |
| WO | WO01/99127 A2 | 12/2001 |

OTHER PUBLICATIONS

P. Stonehart, "Self-Humidifying Polymer Electrolyte Membranes for Fuel Cells," J. Electrochem Soc., vol. 143, No. 12, Dec. 1996, pp. 3847-3852.
M. Watanabe et al., "Analyses of Self- Humidification and Suppression of Gas Crossover in Pt-Dispersed Polymer Electrolyte Membranes for Fuel Cells," J. Electrochem, Soc., vol. 145, No. 4, Apr. 1998, pp. 1137-1141.
F.N. Büchi et al., "Operating Proton Exchange Membrane Fuel Cells Without External Humidification of the Reactant Gases," J. Electrochem. Soc., vol. 144, No. 8, Aug. 1997, pp. 2767-2772.
I. Ruff et al., "Transfer Diffusion. I. Theoretical," Journal of Physical Chemistry, vol. 75, No. 21, 1971, pp. 3297-3302.
I. Ruff et al., "Transfer Diffusion. II. Kinetics of Electron Exchange Reaction between Ferrocene and Ferricinium Ion in Alcohols," Journal of Physical Chemistry, vol. 75, No. 21, 1971.
M. Watanabe et al., "Polymer Electrolyte Membranes Incorporated with Nanometer-Size Particles of Pt and/or Metal-Oxides: Experimental Analysis of the Self-Humidification and Suppression of Gas-Crossover in Fuel Cells," J. Phys. Chem. B, vol. 102, 1998, pp. 3129-3117.
Tae-Hyun Yang et al., "A novel preparation method for a self-humidifying polymer electrolyte membrane," Journal of Power Sources, vol. 106, 2002, pp. 328-332.
H. Uchida et al., "Self-Humidifying Electrolyte Membranes for Fuel Cells, Preparation of Highly Dispersed $TiO_2$ Particles in Nafion 112," J. Electrochem. Soc., vol. 105(1), 2003, pp. A57-A62.
D.A. Buttry et al., "Effects of Electron Exchange and Single-File Diffusion on Charge Propagation in Nafion Films Containing Redox Couples," J. Am. Chem. Soc., vol. 105, No. 4, 1983, pp. 685-689.
H.S. White et al., "Investigation of Charge Transport Mechanisms in Nafion Polymer-Modified Electrodes," J. Am. Chem. Soc., vol. 104, 1982, pp. 4811-4817. K. Dahms, "Electronic Conduction in Aqueous Solution," J. Phys. Chem., vol. 72, 1968, pp. 362-364.
I. Ruff et al., "Application of Diffusion Constant Measurement to the Determination of the Rate Constant of Electron-Exchange Reactions," Inorg. Chem., vol. 9, 1970, pp. 186-188.
H. Sakhalkar et al., "Admicellar Polymerization of Polystyrene on Glass Fibers," Langmuir, vol. 11, 1995, pp. 3369-3373.
U.E. Steiner et al., "Magnetic Field Effects in Chemical Kinetics and Related Phenomena," Chem. Rev., vol. 89, 1989, pp. 51-147.
S.R. Ragsdale et al., "Analysis of the Magnetic Force Generated at a Hemispherical Microelectrode," Anal. Chem., vol. 69, 1997, pp. 2070-2076.
S.R. Ragsdale et al., "Imaging Microscopic Magnetohydrodynamic Flows," Anal. Chem., vol. 71, 1999, pp. 1923-1927.
S.R. Ragsdale et al., "Electrochemically Generated Magnetic Forces Enhanced Transport of a Paramagnetic Redox Species in Large, Nonuniform Magnetic Fields," J. Am. Chem. Soc., vol. 120, 1998, pp. 13461-13468.

(Continued)

*Primary Examiner* — Raymond Alejandro
(74) *Attorney, Agent, or Firm* — Foley & Lardner LLP (57) ABSTRACT

Disclosed are self-hydrating membrane electrode assemblies (MEAs), including MEAs that have been magnetically modified, which comprises (i) a cathode comprising an electrically conducting material having a catalytic material on at least a portion of a first surface thereof, the catalytic material comprising an effective amount of at least one catalyst component and at least one ion conducting material; (ii) a separator adjacent to and in substantial contact with the first surface of the cathode and comprising an ion conducting material; and (iii) an anode adjacent to and in substantial contact with the surface of the separator opposite the cathode and comprising an electrically conducting material having a catalytic material on at least a portion of a surface thereof adjacent to the separator, the catalytic material comprising an effective amount of at least one catalyst component and at least one ion conducting material; wherein the separator permits water to pass from the first surface of the cathode to the surface of the anode in an amount sufficient to sustain hydration of the anode and further wherein the cathode produces sufficient water to sustain hydration of the anode. Also disclosed are methods of manufacture of the self-hydrating MEAs, as well as fuel cells that require only a self-hydrating MEA and a source of fuel.

69 Claims, 4 Drawing Sheets

OTHER PUBLICATIONS

A.J. Appleby, "Recent developments and applications of the polymer fuel cell," Phil. Trans. R. Soc. Lond., vol. 354, 1996, pp. 1681-1693.

N.J. Turro et al., "Magnetic Field and Magnetic Isotope Effects in Organic Photochemical Reactions. A Novel Probe of Reaction Mechanisms and a Method for Enrichment of Magnetic Isotopes," Accounts of Chemical Research, vol. 13, 1980, pp. 369-377.

M. Watanabe et al., "Design of CO Tolerant Anode Catalysts for Polymer Electrolyte Fuel Cell," Electrochemistry, vol. 67, No. 12, Dec. 1999, pp. 1194-1196.

C. Korzeniewski, "Vibrational Coupling Effects on Infrared Spectra of Adsorbates on Electrodes," Interfacial Electrochemistry, 1999, pp. 345-352.

A.J. Bard et al., Electrochemical Methods: Fundamentals and Applications, 2001, pp. 107-115.

H. Bamnolker et al., "Dispersion Polymerization of Styrene in Polar Solvents: Effect of Reaction Parameters on Microsphere Surface Composition and Surface Properties, Size and Size Distribution, and Molecular Weight," J. Poly. Sci., vol. 34, No. 10, Jul. 30, 1996, pp. 1857-1871.

A. Carrington et al., Introduction to Magnetic Resonance with Applications to Chemistry and Chemical Physics, 1967, pp. 80-83.

A.J. Bard et al., "Appendix B: Digital Simulations of Electrochemical Problems," Electrochemical Methods: Fundamentals and Applications, 1980, pp. 675-698.

J.T. Maloy, "Digital Simulation of Electrochemical Problems," Laboratory Techniques in Electro-analytical Chemistry, 1984, pp. 417-461.

S.W. Feldberg, "Digital Simulation of Electrochemical Surface Boundary Phenomena, Multiple Electron Transfer and Adsorption," Electrochemistry: Calculations, Simulation, and Instrumentation, 1972, pp. 185-215.

A.J. Bard et al., Electrochemical Methods: Fundamentals and Applications, 1980, pp. 618-621.

R.A. Marcus, "Electron Transfer at Electrodes and in Solution: Comparison of Theory and Experiment," Electrochimica Acta, vol. 13, 1968, pp. 995-1004.

D.A. Buttry et al., "Electron Hopping vs. Molecular Diffusion as Charge Transfer Mechanisms in Redox Polymer Films," J. Electroanal. Chem., vol. 130, 1981, pp. 333-338.

A. Carrington et al., Introduction to Magnetic Resonance with Applications to Chemistry and Chemical Physics, 1967, pp. 229-236.

R.Z. Sagdeev et al., "The Influence of the Magnetic Field on Processes Involving Radicals and Triplet Molecules in Solutions," Russian Chemical Reviews, vol. 46, No. 4, Apr. 1977, pp. 298-315.

P. Atkins, "Magnetic Field Effects," Chemistry in Britain, vol. 12, No. 7, Jul. 1976, pp. 214-228.

T.Z. Fahidy, "Magnetoelectrolysis," J. App. Electrochem., vol. 13, 1983, pp. 553-563.

A.L. Buchachenko, "Magnetic Effects in Chemical Reactions," Russian Chemical Reviews, vol. 45, May 1976, pp. 375-390.

M. Watanabe et al., "Mechanism of CO Tolerance at Pt-Alloy Anode Catalysts for Polymer Electrolyte Fuel Cells," Electrochemistry, vol. 68, No. 4, Apr. 2000, pp. 244-251.

S. Kartha et al., "Fuel Cells: Energy Conversion for the Next Century," Physics Today, vol. 47, No. 11, Nov. 1994, pp. 54-61.

J. Leddy et al., "Magnetically Modified Fuel Cells," $39^{th}$ Power Source Proceedings, 2000, pp. 144-147.

P.W. Atkins et al., "The Effect of a Magnetic Field on Chemical Reactions," Annual Reports on the Progress of Chemistry, vol. 72, 1975, pp. 67-88.

W.L. Gellett et al., "Self-hydrating Membrane Electrode Assemblies for Fuel Cells," $204^{th}$ Meeting of the Electrochemical Society (Oct. 15, 2003) (abstract).

J. Leddy et al., "Magnetic Ion Exchange Polymer Composites: Transport Enhancements Driven by Non-Uniform Magnetic Fields and Magnetic Moments of Transported Molecular and Ionic Species," Proceedings of the $37^{th}$ Power Sources Conference, United States Army Research Laboratory, Jun. 17-20, 1996, pp. 93-96.

K.M. Salikhov et al., "Spin Polarization and Magnetic Effects in Radical Reactions," vol. 22 of Studies in Physical and Theoretical Chemistry Elsevier: New York, NY, 1984, pp. 168-242.

S. Minteer, "Magnetic Field Effects on Electron Transfer Reactions," Ph.D. Thesis, University of Iowa, 2000.

* cited by examiner

SELF-HYDRATING MEMBRANE ELECTRODE ASSEMBLIES FOR FUEL CELLS

BACKGROUND OF THE INVENTION

1. Field of the Invention

The present invention relates to self-hydrating membrane electrode assemblies (MEAs), including MEAs that have been magnetically modified, and to methods of manufacture of the same. The present invention further relates to fuel cells that require only a self-hydrating MEA and a source of fuel.

2. Background of the Related Art

A fuel cell is a device that converts the energy of a chemical reaction into electricity. It differs from a battery primarily in that the fuel and oxidant are stored external to the cell, which can therefore generate power only as long as the fuel and oxidant are supplied. Moreover, unlike secondary batteries, fuel cells do not undergo charge/discharge cycles.

A fuel cell produces an electromotive force by bringing the fuel and oxidant into contact with two suitable, but different, electrodes separated by an electrolyte. A fuel, such as hydrogen gas for example, is introduced at a first electrode, where it reacts electrochemically in the presence of the electrolyte to produce electrons and protons in the first electrode.

These electrons are then circulated from the first electrode to a second electrode through an electrical circuit connecting the electrodes. Protons pass through the electrolyte to the second electrode.

At the same time as the fuel is introduced to the first electrode, an oxidant, such as oxygen gas or air, is introduced to the second electrode, where it reacts electrochemically in presence of the electrolyte to consume the electrons that have circulated through the electrical circuit and the protons that have passed through the electrolyte.

The first electrode is therefore an oxidizing electrode, while the second electrode is a reducing electrode. Thus, in the case of $H_2/O_2$ and $H_2/air$ cells, the respective half-cell reactions at the two electrodes are:

$$H_2 \rightarrow 2H^+ + 2e^-; \text{ and} \quad (1)$$

$$\tfrac{1}{2}O_2 + 2H^+ + 2e^- \rightarrow H_2O. \quad (2)$$

The electrical circuit connecting the two electrodes withdraws electrical current from the cell and thus receives electrical power. The overall fuel cell reaction produces electrical energy according to the sum of the separate half-cell reactions above. In addition to electrical energy, water is formed at the cathode as a byproduct of the reaction as well as some heat energy.

For many practical applications, fuel cells are usually not operated as single units due, at least in part, to the relatively low electrical energy produced by individual cells. Rather, fuel cells may be connected in a series, stacked one on top of the other, or placed side by side.

A series of fuel cells (referred to as a "fuel cell stack") is normally enclosed in a housing. The fuel and oxidant are directed with manifolds to the electrodes, and the required cooling (to dissipate the heat energy) may be provided by the reactants or by a cooling medium.

Also within most common fuel cell stacks are current collectors, cell-to-cell seals, insulations, piping, and/or instrumentation. The combination of the fuel cell stack, housing, and associated hardware is known as a "fuel cell module."

Fuel cells may be classified by the type of electrolyte (e.g., liquid or solid) that they contain. Fuel cells using electrolytes such as the solid polymer membranes referred to as "proton exchange membranes" or "polymer electrolyte membranes" (PEMs) operate best when the PEM is kept moist with water (PEMs transfer protons more efficiently when wet than when dry). The PEM therefore generally requires constant humidification during operation of the fuel cell.

This humidification has been achieved by adding water to the reactant gases (e.g. hydrogen and oxygen or air) that pass by the membrane on each side of the MEA. The accessories required for humidification, however, add instrumentation and weight to the fuel cell as well as increasing mechanical complexity and reducing output due to parasitic power loss (the energy required to heat water for humidification can consume 15% or more of power output).

The PEM used in solid polymer fuel cells acts both as the electrolyte as well as a barrier that prevents the mixing of the reactant gases, a potentially disastrous situation. Examples of suitable membrane materials are the polymeric perfluorocarbon ionomers generally containing a basic unit of fluorinated carbon chain and one or more sulphonic acid groups. There may be variations in the molecular configurations and/or molecular weights of this membrane. One such membrane commonly used as a fuel cell PEM is sold by E. I. DuPont de Nemours under the trademark "NAFION" (tetrafluoroethylene-perfluoro-3,6-dioxa-4-methyl-7-octenesulfonic acid copolymer). Typically, best fuel cell performance is obtained using these membranes if the fuel cells are operated under fully hydrated, i.e. essentially water-saturated, conditions. Thus, the PEM must be continuously humidified during fuel cell operation.

There have been other attempts to provide the necessary humifidication to a fuel cell PEM, or eliminate the need therefore entirely For example, U.S. Pat. No. 5,318,863 to Dhar discloses solid polymer fuel cells which operate at near ambient temperature and pressure without humidification. One such fuel cell employs very thin electrodes having a slightly oversize solid PEM between and in contact with them. The PEM has either a low gram equivalent weight or has a higher gram equivalent weight but is very thin so as to permit proton transfer at reduced internal electrolyte resistance. This decreased internal electrolyte resistance is intended to permit operation of the fuel cell at mild conditions without humidification. The use of very thin membranes can permit easier conductivity of water due to the shorter transport path length, but such membranes do not exhibit long term stability and frequently permit $H_2$ crossover (which bleeds power). U.S. Pat. No. 5,242,764, also to Dhar, discloses a fuel cell which employs a solid PEM having a central hole between and in contact with the electrodes.

All of the above described fuel cells and MEAs, however, suffer from one or more problems and/or disadvantages that limit their applicability and/or commercial potential. Most state-of-the-art fuel cells use MEAs that typically require substantial hardware to sustain fuel cell operation. This includes hardware to pressurize, humidify and/or heat the fuel cell. This hardware introduces moving parts that substantially complicate the system and dramatically increase the weight and cost, as well as increasing mechanical noise, thermal signature and complexity.

Accordingly, there remains a need in the art for a fuel cell that runs without added pressurization, humidification and/or heat, and therefore without any of the extraneous hardware of prior fuel cells.

SUMMARY OF THE INVENTION

An object of the present invention is to solve at least the problems and/or disadvantages described above and to provide at least the advantages described hereinafter.

Another object of the present invention is to provide self-hydrating membrane electrode assemblies (MEAs).

Still another object of the present invention is to provide fuel cells that run without added pressurization, humidification and/or heat.

Yet another object of the present invention is to provide methods of making self-humidifying MEAs and fuel cells that run without added pressurization, humidification and/or heat.

In accordance with these and other objects, a first embodiment of the present invention is directed to a self-hydrating membrane electrode assembly for fuel cells comprising: (i) a cathode comprising an electrically conducting material having a catalytic material on at least a portion of a first surface thereof, wherein the catalytic material comprises at least one catalyst component and at least one ion conducting material; (ii) a separator adjacent to and in substantial contact with the catalytic material and the first surface of the cathode (i.e. the surface of the cathode having the catalytic material thereon) and comprising an ion conducting material; and (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material, and further wherein the separator permits water to pass from the first surface of the cathode to the surface of the anode in an amount sufficient to sustain hydration of the anode and the cathode produces sufficient water to sustain hydration of the anode.

A second embodiment of the present invention is directed to a self-hydrating membrane electrode assembly for fuel cells comprising: (i) a cathode comprising an electrically conducting material having a catalytic material on at least a portion of a first surface thereof, wherein the catalytic material comprises at least one catalyst component and at least one ion conducting material; (ii) a separator adjacent to and in substantial contact with the catalytic material and the first surface of the cathode (i.e. the surface of the cathode having the catalytic material thereon) and comprising an ion conducting material; and (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material, and further wherein the separator permits water to pass from the first surface of the cathode to the surface of the anode in an amount sufficient to sustain hydration of the anode and the cathode produces sufficient water to sustain hydration of the anode, and further wherein the catalytic material on the cathode and/or the anode contains a modifying material, such as a polyalkylene or derivative thereof, that modifies at least one property thereof.

A third embodiment of the present invention is directed to a self-hydrating membrane electrode assembly for fuel cells comprising: (i) a cathode comprising an electrically conducting material having a catalytic material on at least a portion of a first surface thereof, wherein the catalytic material comprises at least one catalyst component and at least one ion conducting material; (ii) a separator adjacent to and in substantial contact with the catalytic material and the first surface of the cathode (i.e. the surface of the cathode having the catalytic material thereon) and comprising an ion conducting material; and (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material, and further wherein the separator permits water to pass from the first surface of the cathode to the surface of the anode in an amount sufficient to sustain hydration of the anode and the cathode produces sufficient water to sustain hydration of the anode, and further wherein the separator has been subjected to a modifying process, such as hot acid treatment, that modifies at least one property thereof.

A fourth embodiment of the present invention is directed to a self-hydrating membrane electrode assembly for fuel cells comprising: (i) a cathode comprising an electrically conducting material having a catalytic material on at least a portion of a first surface thereof, wherein the catalytic material comprises at least one catalyst component and at least one ion conducting material; (ii) a separator adjacent to and in substantial contact with the catalytic material and the first surface of the cathode (i.e. the surface of the cathode having the catalytic material thereon) and comprising an ion conducting material; (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material; and (iv) a gasket or seal adjacent to and in substantial contact with the surface of the cathode and/or the anode which does not have catalytic material thereon and with the separator, and further wherein the separator permits water to pass from the first surface of the cathode to the surface of the anode in an amount sufficient to sustain hydration of the anode and the cathode produces sufficient water to sustain hydration of the anode.

A fifth embodiment of the present invention is directed to a self-hydrating membrane electrode assembly for fuel cells comprising: (i) a cathode comprising an electrically conducting material having a catalytic material on at least a portion of a first surface thereof, wherein the catalytic material comprises at least one catalyst component and at least one ion conducting material; (ii) a separator adjacent to and in substantial contact with the catalytic material and the first surface of the cathode (i.e. the surface of the cathode having the catalytic material thereon) and comprising an ion conducting material; (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material; and (iv) a gasket or seal adjacent to and in substantial contact with the surface of the cathode and/or the anode which does not have catalytic material thereon and with the separator, wherein the separator permits water to pass from the first surface of the cathode to the surface of the anode in an amount sufficient to sustain hydration of the anode and the cathode produces sufficient water to sustain hydration of the anode, and further wherein the separator has been subjected to a modifying process, such as hot acid treatment, that modifies at least one property thereof, and still further wherein the catalytic material on the cathode and/or the anode contains a modifying material, such as a polyalkylene or derivative thereof, that modifies at least one property thereof.

Additional embodiments of the present invention include magnetically modified self-hydrating membrane electrode assemblies for fuel cells in which each of the above further contain magnetic particles and/or magnetizable particles in the catalytic material on the cathode and/or the anode.

Additional advantages, objects and feature of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference, at least in part, to the following drawings in which like reference numerals refer to like elements wherein.

DETAILED DESCRIPTION OF PREFERRED EMBODIMENTS

Unless otherwise stated, a reference to a compound or component includes the compound or component by itself, as well as in combination with other compounds or components, such as mixtures of compounds and/or components.

As used herein, the singular forms "a," "an," and "the" include the plural reference unless the context clearly dictates otherwise.

As used herein, the term "within the vicinity of the particle" is intended to mean sufficiently close to the particle for it to exert its effect(s) on the reactant(s) and/or product(s) involved in the relevant chemical reaction. Such distances will therefore vary depending, for example, on the nature of the particle, including its composition and size, and the strength of the magnetic field, as well as the reactant(s) involved in the affected chemical reaction and the product(s) yielded.

As used herein, the term "catalytic material" is intended to mean the substance(s) found on the surface of a cathode or anode in a fuel cell responsible for the chemical reaction(s) involved in the production of electrical power and the transfer of that power (e.g. in the form of subatomic particles such as electrons or protons) from the site of the chemical reaction(s). Thus, as used herein, a "catalytic material" contains at least one "catalyst component" (the substance or a component thereof that catalyzes the relevant chemical reaction(s) involved) and at least one ion conducting material. The "catalytic material" may also contain other components, such as a modifying material, which is not directly involved in the chemical reaction(s), or magnetic and/or magnetizable particles, which may or may not be directly involved in the chemical reaction(s).

As used herein, the term "modifying material" is intended to mean a material that affects at least one of the following properties of a substance: hydrophilicity, hydrophobicity, organophobicity, organophilicity, surface charge, dielectric constant, porosity, gas exclusion, gas permeability, deliquescence, wetting, density, electron conductivity and ionic conductivity.

A first preferred embodiment of the present invention is directed to a self-hydrating membrane electrode assembly for fuel cells comprising:

(i) a cathode comprising an electrically conducting material having a catalytic material on at least a portion of a first surface thereof, wherein the catalytic material comprises at least one catalyst component and at least one ion conducting material;

(ii) a separator adjacent to and in substantial contact with the catalytic material and the first surface of the cathode (i.e. the surface of the cathode having the catalytic material thereon) and comprising an ion conducting material; and (iii) an anode adjacent to and in substantial contact with the surface of the separator opposite the cathode and comprising an electrically conducting material having a catalytic material on at least a portion of the surface thereof adjacent to and in substantial contact with the separator, wherein the catalytic material comprises at least one catalyst component and at least one ion conducting material.

According to these embodiments of the present invention, the separator permits water to pass from the surface of the cathode to the surface of the anode. The amount of water that passes through the separator is sufficient to sustain hydration of the anode.

The inventive membrane electrode assembly is therefore completely self-hydrating, i.e. it does not require any external or supplemental humidification for operation.

Thus, according to the present invention, the cathode generates sufficient water to sustain hydration of the anode. The effective amount of catalyst component present in the catalytic material on the cathode may therefore vary from application to application depending upon factors such as the particular fuel employed and the particular composition of the catalytic material, including the particular catalyst component(s) present, as well as any other ingredients. Accordingly, suitable amounts of catalytic component(s) for the catalytic material on the cathode (and the anode) in a given membrane electrode assembly may be determined empirically by one skilled in the art. By way of illustration, when platinum is employed as the catalyst component, it may be present in the catalytic material in an amount as little as 0.1 mg/cm$^2$ up to an amount well in excess of 1 mg/cm$^2$.

Figure 1:
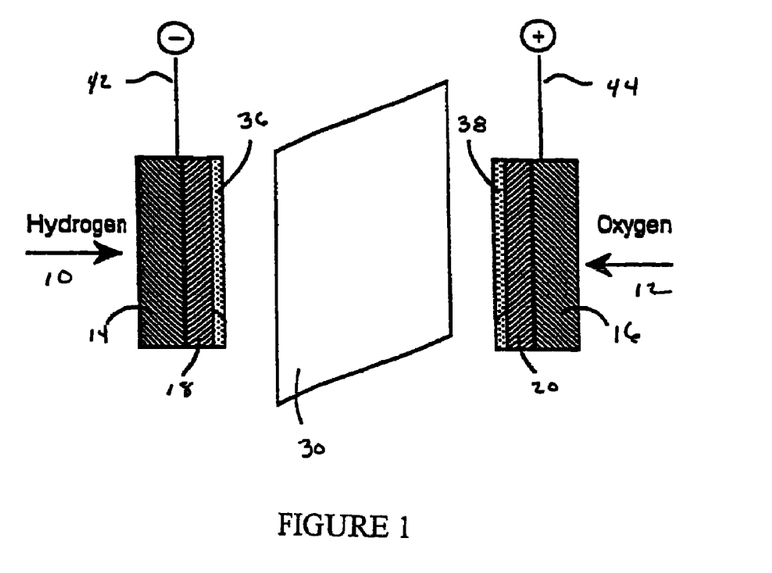
FIGS. 1 and 2 are a schematic cross-section of a fuel cell having features of the present invention.
Figure 2:
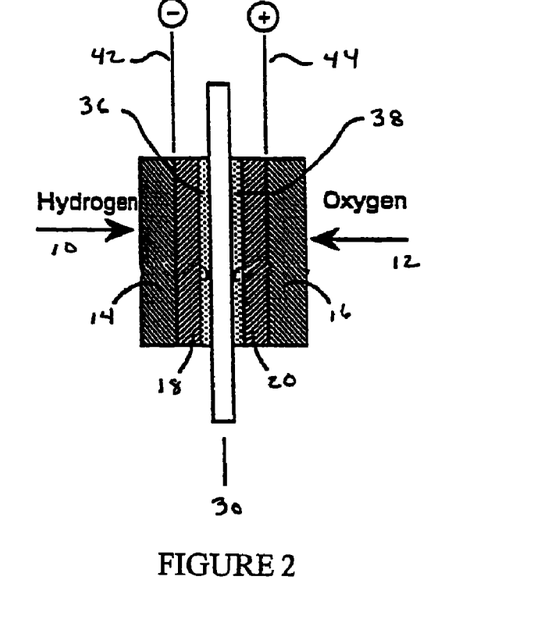

Referring to FIGS. 1 and 2, a schematic cross-section is shown of a fuel cell containing a membrane electrode assembly having features of the present invention. A fuel cell as shown includes gaseous reactants as a fuel source (10) and an oxidizer source (12). These gaseous reactants diffuse through (optional) backing layers (14) and (16), respectively, to an anode (an oxidizing electrode) (18) and a cathode (a reducing electrode) (20). Anode connection (42) and cathode connection (44) are used to interconnect with an external circuit (not shown in figure) or with other fuel cell assemblies.

Anode (18) and cathode (20) each comprise an electrically conducting material. Illustrative examples of suitable conductive materials include, but are not limited to, the following: metals; carbon, such as graphite; semiconductors; semi-metals; magnetic materials; and combinations of two or more thereof. Illustrative examples of suitable metals for use as the conductive material include transition metals, such as Ni, Fe, Zn or Cd, and precious metals, such as Ag, Au, Pt, Ir, Ru, Rh, Os, and Ir. Particularly preferred metals for use as the conductive material include platinum and composites of platinum, such as platinum-ruthenium composites.

Additionally, the conductive material may comprise a mixture of two or more metals, or a metal and a non-metal, such as a polymeric material. Other suitable conductive materials for use as the conductive material in the membrane electrode assemblies according to the present invention include a matrix, e.g., metal matrix, including magnetic particles or magnetic components.

The conductive material may be continuous with no openings therein, such as a rod, foil or sheet, or may be configured to have openings therein, such as a mesh or screen. The conductive material can have any geometrical shape suitable for a predetermined use. Non-limiting examples of such geometries include rods (hollow or solid), circles, squares, triangles, rectangles, and the like.

According to the various embodiments of the present invention, the anode (18) and cathode (20) each have a catalytic material on at least a portion of the surface thereof. The catalytic material on the anode may be the same as the catalytic material on the cathode, or it may be different. According to certain preferred embodiments, the anode (18) and cathode (20) each have a thin layer of said catalytic material (36) and (38), respectively, covering substantially the entire surface thereof adjacent to the separator. Again, each layer may comprise the same catalytic material(s) or different catalytic materials.

Each catalytic material layer contains an effective amount of at least one catalyst component. Various catalyst components are suitable for use in the catalytic material. These catalyst components include, but are not limited to, iridium, platinum, palladium, gold, silver, copper, nickel, iron, osmium, ruthenium, cobalt, and various alloys of these materials, as well as combinations of these materials and/or alloys thereof. Other suitable catalyst components include, but are not limited to, suitable non-metals, such as electronically conducting mixed oxides with, for example, a spinel or perovskite structure. According to a particularly preferred specific embodiment, the catalytic material (36) on the anode (18) comprises platinum, and the catalytic material (38) on the cathode (20) comprises either platinum or another oxygen-reducing catalyst (for example, a macrocyclic chelate compound).

The amount of catalyst component(s) present in the catalytic material will vary depending upon the particular catalyst component(s) selected, the gaseous reactants involved and the like. Suitable amounts of catalyst component for a particular membrane electrode assembly may therefore be determined empirically by one skilled in the art. By way of illustration and not of limitation, if, for example, the catalyst component on the cathode and/or anode is platinum, then it may preferably be present in any amount from $0.1$ $mg/cm^2$ up to 1 $mg/cm^2$ or even several $mg/cm^2$, such as $0.1$ $mg/cm^2$ to $0.8$ $mg/cm^2$, and more preferably in an amount of about $0.1$ $mg/cm^2$ to about $0.5$ $mg/cm^2$, such as about $0.3$ $mg/cm^2$ to about $0.4$ $mg/cm^2$.

In addition to the catalyst component or components, the catalytic material may also further comprise at least one ion conducting material. Suitable ion conducting materials are known and available to those skilled in the art. Illustrative examples of such ion conducting materials include, but are not limited to, polymers generally useful in polymer electrolyte membranes. Particularly preferred ion conducting materials include perfluoroinated sulfonic acid polymers, such as the material known under the trademark NAFION (tetrafluoroethylene-perfluoro-3,6-dioxa-4-methyl-7-octenesulfonic acid copolymer) and available from E.I. DuPont de Nemours or Ion Power, Inc. A most preferred ion conducting material for use in various embodiments of the present invention is NAFION 1100 (tetrafluoroethylene-perfluoro-3,6-dioxa-4-methyl-7-octenesulfonic acid copolymer 1100). According to certain very preferred embodiments, the ion conducting material in the catalytic material on the cathode and the anode is the same as the ion conducting material of the separator.

The amount of ion conducting material present in the catalytic material will vary depending upon the particular ion conducting material employed, the other components of the membrane electrode assembly, the gaseous reactants involved and the like. Suitable amounts of ion conducting material for a particular membrane electrode assembly may therefore be determined empirically by one skilled in the art. By way of illustration and not of limitation, if, for example, the ion conducting material in the catalytic material on the cathode and/or anode is Nafion, then it may be present in an amount of about 5-35 dry wt % of the (dry) catalyst material layer, preferably about 30 dry wt %.

The catalytic material may also further comprise at least one modifying material in addition to the catalyst component(s) and, if present, the ion conducting material. The modifying material affects at least one chemical or physical property of the catalytic material, including, but not limited to, the following: hydrophilicity, hydrophobicity, organophilicity, organophobicity, surface charge, dielectric constant, porosity, gas exclusion, gas permeability, deliquescence, wetting, density, electron conductivity and ionic conductivity.

Suitable modifying materials are known and available to those skilled in the art. Illustrative examples of suitable modifying materials include, but are not limited to, polyalkylenes and derivatives thereof, such as partially or fully fluorinated polyalkylenes (e.g. TEFLON, polytetrafluoroethylene). A particularly preferred polyalkylene for use in certain embodiments of the present invention, such as membrane electrode assemblies that employ perfluoroinated sulfonic acid polymers (e.g. NAFION, tetrafluoroethylene-perfluoro-3,6-dioxa-4-methyl-7-octenesulfonic acid copolymer) as the ion conducting material, is polyethylene.

According to other preferred embodiments of the present invention, the modifying material may be a hydrophilic material, such as polyhydroxymethylmethacrylate or polyhydroxyethylmethacrylate, that improves the interfacial humidification of the membrane electrode assembly.

The amount of modifying material present in the catalytic material will vary depending upon the particular components of the membrane electrode assembly, the gaseous reactants involved and the like. Suitable amounts of modifying material for a particular membrane electrode assembly may therefore be determined empirically by one skilled in the art.

The catalytic material may also further comprise a plurality of magnetic particles and/or magnetizable particles.

In those embodiments of the present invention in which magnetic particles are present, the particles each possess a magnetic field of sufficient strength to alter the rate of and/or distribution of products resulting from a chemical reaction involving the particle or occurring within the vicinity of the particle. Such a chemical reaction may involve mass transport, transfer of subatomic particles (e.g. electrons and protons) and/or flux of a solute.

In those embodiments of the present invention in which magnetizable particles are present, the particles have been exposed to a magnetic field of sufficient strength for a sufficient time to align the magnetic moments of at least a portion of the atoms (preferably a majority and even more preferably a substantial majority) within at least a portion of the particles (and preferably a majority and even more preferably a substantial majority thereof). According to these embodiments of the present invention, the portion of atoms aligned within a given particle is sufficient to alter the rate of and/or distribution of products resulting from a chemical reaction involving the particle or occurring within the vicinity of the particle. Preferably, the alignment of atoms is maintained upon removal of the magnetic field, but this is not required (for example, in the case of superparamagnetic materials). Such a chemical reaction may involve mass transport, transfer of subatomic particles (e.g. electrons and protons) and/or flux of a solute.

The magnetizable particles may be subjected to a magnetic field before, during, and/or after incorporation into the inventive membrane electrode assemblies. The magnetic field may be applied, for instance, by use of a permanent magnet or an electromagnet. For instance, a magnet may be brought near or in contact with the particles or immersed into a container holding the particles. Preferably, the magnetic field strength is slightly stronger than the saturation magnetization of the particles, although weaker fields can also be employed. Illustrative examples of suitable field strengths for $Fe_3O_4$ or $Fe_2O_3$ particles are in the range of about 0.05 to about 2.0 T, preferably about 0.1 to about 1.0 T, and more preferably about 0.2 to about 0.5 T.

Examples of suitable materials for use as particles in the membrane electrode assemblies of the present invention include, but are not limited to, the following: permanent magnetic materials, paramagnetic materials, superparamagnetic materials, ferromagnetic materials, ferrimagnetic materials, superconducting materials, anti-ferromagnetic materials, mu metals, and combinations thereof.

According to certain embodiments of the present invention, the particles may comprise a permanent magnetic material. Suitable permanent magnetic materials are known and available to those skilled in the art. Illustrative examples of suitable permanent magnetic materials include, but are not limited to, samarium cobalt, neodynium-iron-boron, aluminum-nickel-cobalt, iron, iron oxide, cobalt, misch metal, ceramic magnets comprising barium ferrite and/or strontium ferrite, and mixtures thereof.

According to other embodiments of the present invention, the particles may comprise a paramagnetic material. Suitable paramagnetic materials are known and available to those skilled in the art. Illustrative examples of suitable paramagnetic materials include, but are not limited to, aluminum, stainless steel, gadolinium, chromium, nickel, copper, iron, manganese, and mixtures thereof.

According to still other embodiments of the present invention, the particles may comprise a superparamagnetic material. Suitable superparamagnetic materials are known and available to those skilled in the art.

According to still other embodiments of the present invention, the particles may comprise a ferromagnetic material. Suitable ferromagnetic materials are known and available to those skilled in the art. Illustrative examples of suitable ferromagnetic materials include, but are not limited to, Ni—Fe alloys, iron, and combinations thereof.

According to still other embodiments of the present invention, the particles may comprise a ferrimagnetic material. Suitable ferrimagnetic materials are known and available to those skilled in the art. Illustrative examples of suitable ferrimagnetic materials include, but are not limited to, rare earth transition metals, ferrite, gadolinium, terbium, and dysprosium with at least one of Fe and Co, and combinations thereof.

According to still other embodiments of the present invention, the particles may comprise a superconducting material. Suitable superconducting materials are known and available to those skilled in the art. Illustrative examples of suitable superconducting materials include, but are not limited to, niobium titanium, yttrium barium copper oxide, thallium barium calcium copper oxide, bismuth strontium calcium copper oxide, and combinations thereof.

According to still other embodiments of the present invention, the particles comprise an anti-ferromagnetic material. Suitable anti-ferromagnetic materials are known and available to those skilled in the art. Illustrative examples of suitable anti-ferromagnetic materials include, but are not limited to, FeMn, IrMn, PtMn, PtPdMn, RuRhMn, and combinations thereof.

Other suitable particles which may be used in the membrane electrode assemblies according to the present invention include $AB_5$ alloys, such as $La_{0.9}Sm_{0.1}Ni_{2.0}Co_{3.0}$, and $AB_2$ alloys, such as $Ti_{0.51}Zr_{0.49}V_{0.70}Ni_{1.18}Cr_{0.12}$ or $MmNi_{3.2}Co_{1.0}Mn_{0.6}Al_{0.2}$, where Mm is misch metal (25 wt % La, 50 wt % Ce, 7 wt % Pr, and 18 wt % Nd). Such materials can be used alone or in combination. Thus, the catalytic material may include stoichiometric particles, such as $Sm_2Co_7$ or $Fe_3O_4$, or non-stoichiometric particles, such as $La_{0.9}Sm_{0.1}Ni_{2.0}Co_{3.0}$, or a combination thereof.

In addition to or in place of the above materials, the particles may comprise a ceramic magnet. Examples of suitable ceramic magnets include, but are not limited to, those made of barium ferrite and/or strontium ferrite.

The amount of magnetic particles and/or magnetizable particles may vary depending upon the particular material present in the particles, the strength of the magnetic field, the other components of the catalytic material and the like. Suitable amounts of magnetic particles and/or magnetizable particles may therefore be determined empirically by one skilled in the art. By way of illustration, magnetic particles and/or magnetizable particles (exclusive of any coatings) may be present in the catalytic material in an amount 0.1 mg/cm² up to 1.0 mg/cm², and more preferably in an amount of about 0.1 mg/cm² to about 0.4 mg/cm², such as about 0.1 mg/cm² to about 0.2 mg/cm².

According to certain preferred embodiments of the present invention, at least a portion of the particles present in the catalytic material are coated with one or more coating layers. For instance, each of the particles may have one coating layer or a plurality of coating layers on at least a portion of their surface. According to such particularly preferred embodiments, the particles have a coating of an inert material and a coating of a modifying material.

When the magnetic particles and/or magnetizable particles are coated with a modifying material, then the particles may be present in the catalytic material in an amount 0.1 mg/cm² up to 1 mg/cm², and more preferably in an amount of about 0.1 mg/cm² to about 0.8 mg/cm², such as about 0.3 mg/cm² to about 0.4 mg/cm².

Suitable inert materials for coating the particles include any materials that do not adversely interact with the environment in which the particles are used. Such coatings can be used, for instance, to protect the particles from the corrosive effects of solvents. Thus, coatings of suitable inert materials render the particle(s) chemically inert and/or mechanically stable. Suitable inert materials are known and available to those skilled in the art.

Preferably, the inert material used to coat the particles is a silane or silicon dioxide. Particularly preferred such coatings include, but are not limited to, trialkoxysilanes, such as 3-aminopropyltrimethoxysilane. By way of illustration and not limitation, if the particles are $Fe_3O_4$, the coating is preferably a silane or silicon dioxide coating prepared via ethanol reduction of tetraethylorthosilicate. Suitable coated particles can be made as disclosed in WO 01/99127, the disclosure of which is herein incorporated by reference in its entirety.

In addition to the inert material, the particles may also have a coating of a modifying material. The modifying material affects at least one chemical or physical property of the particle, including, but not limited to, the following: hydrophilicity, hydrophobicity, organophilicity, organophobicity, surface charge, dielectric constant, porosity, gas exclusion, gas permeability, deliquescence, wetting, density, electron conductivity and ionic conductivity.

Suitable modifying materials are known and available to those skilled in the art. Particularly preferred modifying materials are those that improve the water concentration about the particle(s) and any nearby catalyst component(s) and/or local ionic conductivity. Illustrative examples of suitable modifying materials include, but are not limited to, homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

Further illustrative examples of suitable modifying materials include, but are not limited to, copolymers formed from at least one Monomer A and at least one Monomer B. Examples of Monomer A include, but are not limited to, styrene, methyl acrylate, iso-decyl methacrylate, 2-hydroxyethyl acrylate, and 2-hydroxyethyl methacrylate. Examples of Monomer B include, but are not limited to, 4-styrenesulfonic acid and ethylene glycol dimethacrylate.

While the size of the particles is not particularly limited, in certain embodiments, the particles preferably have sizes ranging from about 0.1 microns to about 15 microns, such as about 0.1 to about 10 microns, about 0.5 to about 10 microns, about 2 microns to about 8 microns, or about 3 microns to about 6 microns.

The separator (30) separates the anode (18) from the cathode (20). The separator is preferably a polymer electrolyte membrane. Preferably, a fluorine-containing solid polymer is employed as the polymer electrolyte membrane.

According to one particularly preferred embodiment of the present invention, one or more perfluorinated sulfonic acid polymers, such as the material known under the trademark Nafion and available from E.I. DuPont de Nemours or Ion Power, Inc., is used as the separator (30). The use of Nafion as a solid polymer electrolyte membrane is more particularly described in U.S. Pat. No. 4,469,579, the disclosure of which is incorporated herein by reference.

Nonetheless, any polymer that could be used as an electrolyte membrane in a solid polymer fuel cell, such as the perfluorocarbon polymers made by Dow Chemicals Company, is equally suitable as the separator (30). Indeed, any fluoropolymer that is known to be useful as an electrolyte membrane in a fuel cell may be employed as the separator (30) in the inventive membrane electrode assemblies. Moreover, the polymer employed as the separator (30) may be the same as or different from the ion conducting material(s) in the catalytic material layer.

The separator should be of sufficient thickness to limit reactant crossovers through the anode and the cathode. By way of example and not limitation, in one preferred embodiment of the present invention, the separator (30) is a Nafion membrane, such as Nafion 1100, having a suitable thickness.

According to preferred embodiments of the present invention, the separator generally has a maximum thickness of less than 20 mils. Preferably, the separator has a maximum thickness of less than or equal to about 10 mils, more preferably less than about 7 mils, even more preferably less than about 5 mils and most preferably less than about 2 mils. According to still other preferred embodiments of the present invention, the separator has a maximum thickness between about 1 mil and about 7 mils. Moreover, the separator (30) may also be composed of a plurality of very thin layers, e.g. less than one micron (1 μm) in thickness, each of which may be the same or different.

According to preferred embodiments of the present invention, the separator is subjected to at least one modifying process prior to inclusion in the inventive membrane electrode assemblies. Such a modifying process may affect at least one chemical or physical property of the particle, including, but not limited to, the following: hydrophilicity, hydrophobicity, organophilicity, organophobicity, surface charge, dielectric constant, porosity, gas exclusion, gas permeability, deliquescence, wetting, density, electron conductivity and ionic conductivity. Preferably, the modifying process(es) enhance hydration of the separator and/or reduce the maximum thickness of the separator. Suitable modifying processes are known to those skilled in the art.

By way of illustration, when a NAFION (tetrafluoroethylene-perfluoro-3,6 -dioxa-4-methyl-7-octenesulfonic acid copolymer) polymer electrolyte membrane (such as those available from Ion Power, Inc.) is employed as the separator, a particularly preferred modifying process involves contacting the membrane with an acidic solution at elevated temperature for a sufficient period of time. For example, a 50 micron thick membrane composed of NAFION 1100 (tetrafluoroethylene-perfluoro-3,6-dioxa-4-methyl-7-octene-sulfonic acid copolymer 1100) is preferably contacted with a 50% aqueous solution of sulfuric acid at 90° C. for two hours prior to incorporation into a membrane electrode assembly of the present invention.

Suitable fuel sources (10) that may be used in conjunction with membrane electrode assemblies made in accordance with the invention in order to produce electrical energy are hydrogen-containing materials (for example, water, methane, and methanol). According to some embodiments, the fuels are supplied to the assemblies in liquid form, while according to alternative embodiments, fuels are supplied in gaseous form. According to still further embodiments, hydrogen is obtained from reversible metal hydride formers, (for example, $LaNi_5$, FeTi and $MnNi_{4.15}Fe_{0.85}$, where Mm is a mischmetal, among others).

Furthermore, many suitable oxidizer sources (12) or oxidizer species are available for combining with the fuel to provide a mixture suitable for powering the fuel cell assemblies described herein. In practice, the most common oxidizer is gaseous oxygen or air.

Preferred embodiments of the present invention also include a gasket or seal adjacent to and in substantial contact with the separator and the portion of the surface of the cathode and/or the anode that does not have the catalytic material thereon. The gasket or seal may contact the edge of the catalytic material, but preferably there is a small separation between the gasket or seal and the edge of the catalytic material. According to certain preferred embodiments of the present invention, the ratio of the outer periphery of the gasket or seal to the inner periphery thereof to an edge of the catalytic material is about 3:about 2:about 1.

The purpose of the gasket or seal is to help contain the reactants in the vicinity around the electrodes and to provide a reservoir of water or humidified air for hydration of the anode. Any material that can effectively attach to the cathode/anode and separator and act as a barrier without degassing or compressing would be suitable. Examples of suitable materials for use as the gasket or seal include, but are not limited to, polymers such as fluoroelastomers, partially or fully fluorinated polyalkanes and natural and synthetic rubbers.

The gasket or seal may be of any suitable thickness, i.e. any thickness that provides the desired result. Accordingly, the gasket or seal is not so thick that electrical contact is lost between the cathode and/or the anode and the electrical connection.

According to certain embodiments of the invention, there is a gasket or seal between the separator and the cathode and a gasket or seal about the separator and the anode. According to other embodiments of the invention, there is a gasket or seal only about the separator and the cathode. According to still other embodiments of the invention, there is a gasket or seal only about the separator and the anode.

A suitable membrane electrode assembly having the features of the present invention may be prepared according to any of the methods and techniques known to those skilled in the art. For example, a suitable membrane electrode assembly may be prepared by putting the components shown in FIG. 1 together and pressing under appropriate conditions, such as under a pressure of about 400 lbs/in$^2$ at a temperature of about 130° C., for a suitable period of time, such as about 3 minutes. The temperature and pressure conditions selected should ensure that the two electrodes (18) and (20) are in good contact with the separator (30) and precise conditions may be determined empirically by one skilled in the art.

The practice of the invention requires no additional humidification of the electrolyte or the reactants. Therefore, the water generated by the fuel cell reaction is not carried away from the electrolyte by a high flow of reactants through the fuel cell or through operation of the cell at high temperature. The preferable conditions for fuel cell operation are thus near stoichiometric flow of the reactants and substantially ambient temperature of the fuel cell.

EXAMPLE

A. Electrode Preparation

Catalytic ink formulation and production—Due to the coating of the catalytic ink on the inside of the mixing container, an excess of 10 fold for one electrode was prepared in order to ensure a proper mix and that there was an adequate supply of ink to coat both the anode and the cathode electrodes gas diffusion layer (GDL). The formulation of enough ink to coat 50 cm$^2$ of electrodes and with a Pt and magnetic loading of 0.4 mg/cm$^2$ follows: (1) 0.100 g Alfa Aesar 20% Pt on carbon support; (2) 1.200 g of Liquion-1100 (5 wt % NAFION 1100 ((tetrafluoroethylene -perfluoro-3,6-dioxa-4-methyl-7-octenesulfonic acid copolymer 1100) EW solution); (3) 1.100 g of de-ionized water; and (4) 0.040 of polymer coated magnetic particles.

To aid in the mixing of the catalytic ink, two 10 mm and one 5 mm aluminum oxide spheres were added to the formulation. The container used to mix the ink was a 30 ml NALGENE (Nalge Nunc International Corporation, Rochester, NY U.S.A) high density polyethylene bottle with a screw top lid that was sealed with PARAFILM (polyolefin film) prior to mixing. The ink was mixed using a ⅜" variable speed drill with input power controlled by a variable alternating current resistor. The mixing container was attached substantially parallel to the axis of the chuck of the drill (preferably at a slightly offset angle) using a buret clamp. One end of the clamp was inserted into to chuck of the drill and the other end was clamped to the top of the bottle where the length of the bottle was substantially (but not exactly) parallel to the shaft of the buret clamp. The mix was rotated at 80% full power, 2000 rpm, for 30 sec. behind a PLEXIGLAS (polymethyl methacrylate) safety shield.

Catalytic ink painting—Two double-sided ELAT carbon cloth (available from E-TEK Division, Somerset, NJ.) electrodes were cut so that the resulting electrode was substantially square with an area of about 5 cm$^2$. 1/10 of the ink formulation prepared above was then applied to the electrode in two steps. First, a thin layer of ink was painted onto the electrode surface using a short bristle brush. Second, the remainder of the ink was pipetted onto the electrode surface having the thin layer of painted ink, and the electrode tilted repeatedly until the ink substantially uniformly covered the electrode surface. The electrodes were allowed to dry in a fume hood until visibly dry, followed by final drying under vacuum (40 mTorr) for about two hours at ambient temperature.

B. Membrane Preparation

The polymer electrolyte membrane used was a NAFION 1100 (tetrafluoroethylene-perfluoro-3,6-dioxa-4-methyl-7-octenesulfonic acid copolymer 1100) EW membrane about 50 microns thick before treatment and manufactured by Ion Power, Inc. The membrane was cut into 3"×3" squares and then subjected to the following process: (1) 30 min. in 500 ml of 5% $H_2O_2$ at 100 ° C.; (2) 60 min in 500 ml of 0.1 M $HNO_3$ at 90° C.; (3) dipped into a boiling de-ionized water rinse; (4) 120 min in 500 ml of 50% $H_2SO_4/H_2O$ at 90° C.; and (5) 30 min boiling de-ionized water rinse.

The membranes were stored in de-ionized water in a glass container covered with Al foil until lamination.

C. Lamination

The lamination of the MEA was a hot-press of the following stack (top to bottom): (1) FURON (silicone rubber), 5"×5"×0.015"; (2) TEFLON (polytetrafluoroethylene), 45 mm ×45 mm ×0.062"; (3) KAPTON (polyimide), 5"×5"×0.002"; (4) electrode, catalytic material layer face down; (5) NAFION (tetrafluoroethylene-perfluoro-3,6-dioxa-4-methyl-7-octenesulfonic acid copolymer) membrane; (6) electrode, catalytic material layer face up; (7) KAPTON (polyimide), 5"×5"×0.002"; (8) TEFLON (polytetrafluoroethylene), 45 mm ×45 mm ×0.062"; and FURON (silicone rubber), 5"×5"×0.015".

The above stack was placed between two temperature-controlled platens of a hydraulic press (15 ton Carver with thermostatically controlled platens). The platens were brought together until the pressure started to increase and the temperature of both platens was set to 128° C. With this press, the temperature ramp takes about 20 min. When the platens reached the desired temperature, the pressure was increased to 0.25 metric tons and held there for three minutes. The pressure was then decreased to that equal to the pressure are the start of the temperature ramp, and the temperature is reduced to 25° C. The FURON (silicone rubber), TEFLON (polytetrafluoroethylene) and Kapten KAPTON (polyimide) layers were then removed using de-ionized water from a squirt bottle.

D. Magnetic Particles

While the self-hydrating MEAs of the present invention function without magnetic modification, the power output of the cells increases at low temperatures (25° C. and 37° C.) with magnetic modification. Two types of $Fe_3O_4$ microparticles were employed, each type having two coatings: an inner inert coating of a silane or silicon dioxide and an outer modifying coating of either polystyrene-poly(4-styrene sulfonic acid) copolymer or poly(2-hydroxyethyl acrylate).

The modifying coating was added to silane or silicon dioxide coated particles (prepared via an ethanol reduction of tetraethyl orthosilicate) by the following procedure:

(1) The following solution was added to a 500 ml, 24-40, 3-neck flask in a constant temperature bath: (a) 150 ml ethanol; (b) 62.5 ml 2-methoxyethanol; and (c) 3.75 g (1.5% w/v of total solution) polyvinylpyrrolidone with MW of 10,000.

(2) 1.5 g of $SiO_2$ coated magnetic particles (2-5 microns in diameter) were added.

(3) The solution was stirred vigorously using an overhead stirrer (Teflon stir blade, 10 mm glass rod, glass bearing ad a variable speed drill controlled by a variable AC resistor).

(4) The solution temperature was increased to 73° C. and allowed to equilibrate for one hour.

(5) A solution of monomer and initiator was then added: (a) 1.5 g (0.6% w/v of total solution volume) benzoyl peroxide; (b) 35.0 g (16% w/v of total soution volume) styrene; and (c) 0.75 g of (4-styrene sulfonic acid) sodium salt, or (a) 2.143 g tert-butyl hydroperoxide solution (70 wt % in water); and (b) 30.0 g of 2-hydroxyethyl acrylate.

(6) The suspension was stirred at 73° C. for 24 hours.

(7) The polymer reaction was quenched by reducing the temperature to 5° C. for 1hour.

(8) The particles were separated and washed with ethanol and then distilled water, and then dried at 80° C.

The particles can be subjected to a magnetic field at any time before, during and/or after the above processing.

E. Fuel Cell Performance

The following is a summary of the performance of self-hydrating MEAs of the present invention, both magnetically modified and nonmagnetic. All cells were tested at 1 atmosphere. For these cells, performance at 0.5 V was not diminished from that observed with external humidification (i.e. water present in the cell other than that produced at the cathode, such as water added to the gas feed). In fact, these cells sometimes performed better when external humidification was terminated. With or without external humidification, the performance of the cells was quite good and very stable. Both magnetically modified and nonmagnetic cells produced according to the present invention performed well, but magnetically modified cells were more robust and tended to recover more quickly when run in higher voltage ranges where water generated at the cathode may not be sufficient to maintain the humidification of the cell. Further, once normalized for Pt content, magnetically modified cells provided substantially higher output than the nonmagnetic cells.

Figure 3A:
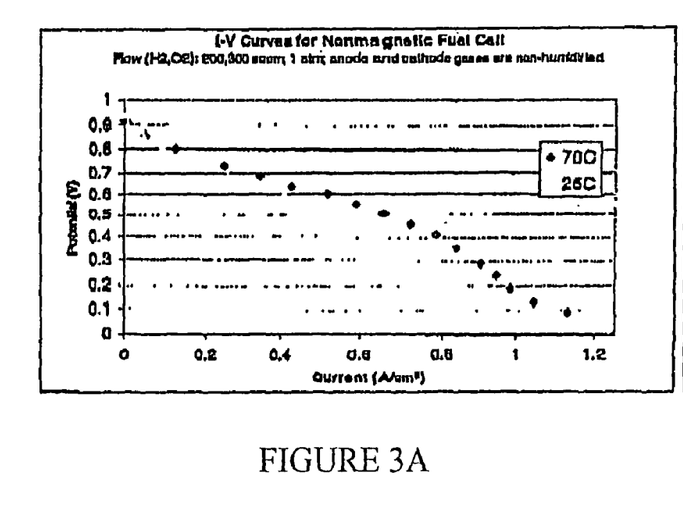
FIGS. 3A and 3B are current voltage and power curves measured for a nonmagnetic cell formed with 0.365 mg/cm$^2$ of Pt on the anode and 0.354 mg/cm$^2$ on the cathode, recorded at 70° C. and 25° C., respectively, using $O_2$ as the oxidant source.
Figure 3B:
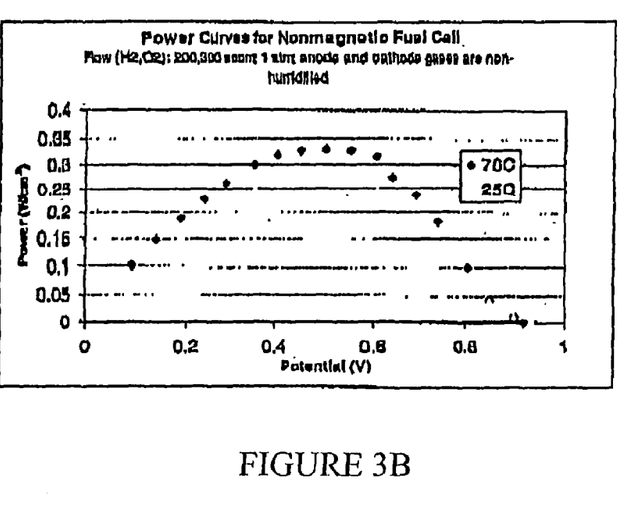

A nonmagnetic cell was formed with 0.365 $mg/cm^2$ of Pt on the anode and 0.354 $mg/cm^2$ on the cathode. The cell was equilibrated at 70° C. with external humidification at 0.5 V, where, once equilibrated, the cell generated 1.35 $A/cm^2$ using $H_2/O_2$. External humidification was terminated and the system re-equilibrated; the cell then generated 0.882 $A/cm^2$ at 0.5 V. The power output was very stable. Current voltage and power curves for the nonmagnetic cell were then recorded at 70° C. and 25° C. as shown in FIGS. 3A and 3B. For each temperature, the cell was equilibrated without external humidification before the curves were recorded. As anticipated, the power decreased with temperature, but the cells were able to generate reasonably high power without external humidification. The cells were run without external humidification for 5 days with only minor diminution (<3%) in power.

Figure 4A:
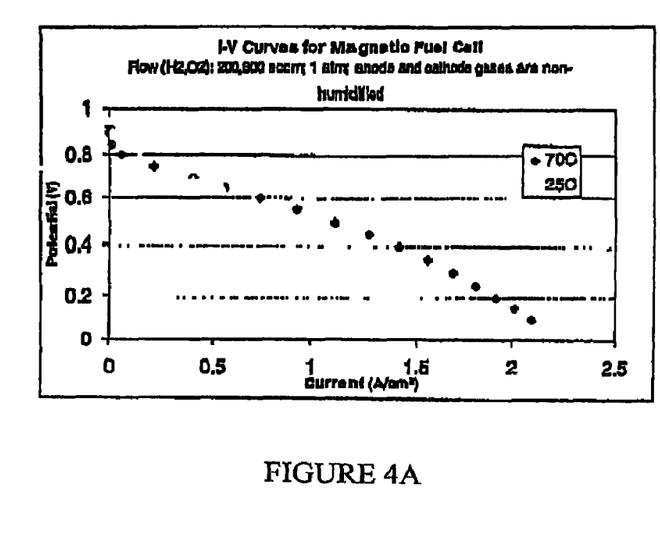
FIGS. 4A and 4B are current voltage and power curves measured for a magnetically modified cell formed with 0.450 mg/cm$^2$ of Pt and 0.523 mg/cm$^2$ of magnetic microparticles ($Fe_3O_4$ particles coated with 2% poly(4-styrene sulfonic acid)-polystyrene copolymer) on the anode and 0.430 mg/cm$^2$ of Pt and 0.501 mg/cm$^2$ of magnetic microparticles on the cathode, recorded at 70° C. and 25° C., respectively, using $O_2$, as the oxidant source.
Figure 4B:
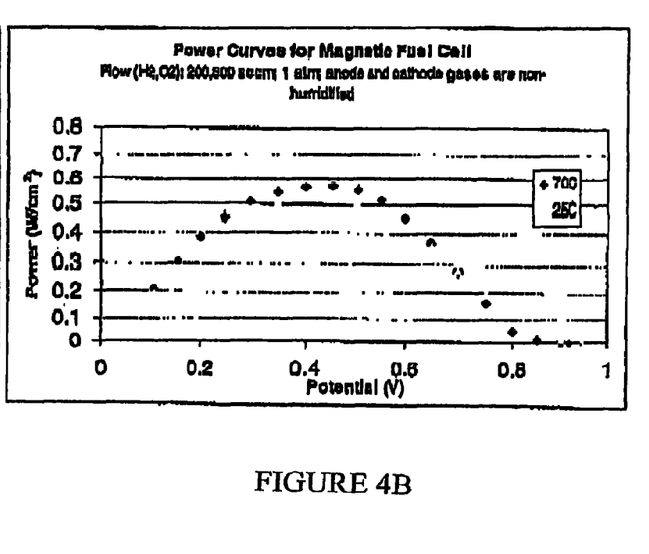

The magnetically modified cell was formed with 0.450 $mg/cm^2$ of Pt and 0.523 $mg/cm^2$ of magnetic microparticles (Fe3O4 particles coated with 2% poly(4-styrene sulfonic acid)-polystyrene copolymer) on the anode and 0.430 $mg/cm^2$ of Pt and 0.501 $mg/cm^2$ of magnetic microparticles on the cathode (this corresponds to 18% more Pt than on the nonmagnetic cell). The cell was equilibrated at 70° C. with external humidification at 0.5 V, where, once equilibrated, the cell generated 1.554 $A/cm^2$ using $H_2/O_2$. External humidification was terminated and the system re-equilibrated; the cell then generated 1.112 $A/cm^2$ at 0.5 V. The power output was very stable. Current voltage and power curves for the magnetically modified cell were then recorded at 70° C. and 25° C. as shown in FIGS. 4A and 4B. For each temperature, the cell was equilibrated without external humidification before the curves were recorded. As anticipated, the power decreased with temperature, but the cells were able to generate reasonably high power without external humidification. The cells were run without external humidification for 4 days with minor diminution (<10%) in power.

Figure 5A:
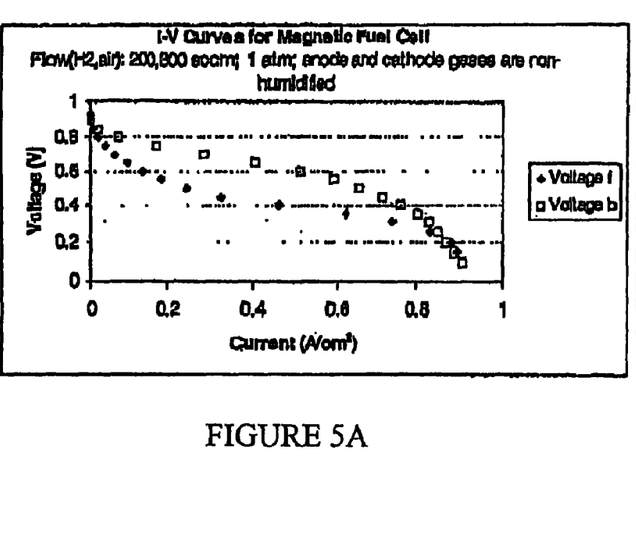
FIGS. 5A and 5B are current voltage and power curves measured for the same magnetically modified cell, recorded at 70° C. and 25° C., respectively, using air as the oxidant source.
Figure 5B:
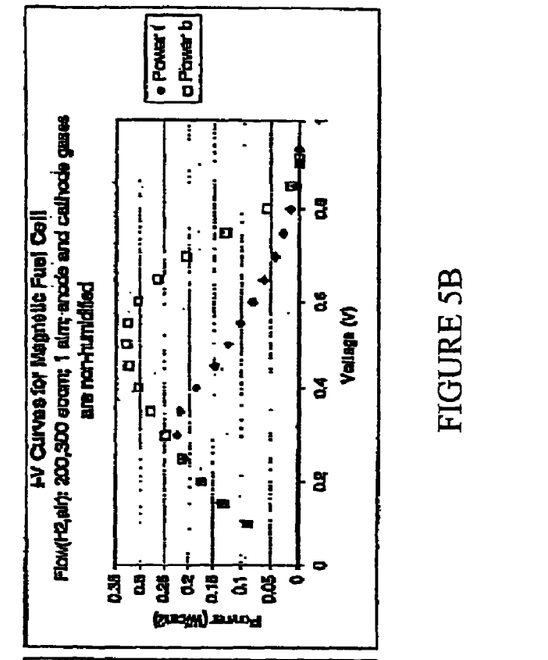

The magnetically modified cell was also run using air as the oxidant source and the results are shown in FIGS. 5A and 5B.

Comparing the nonmagnetic cells to the magnetically modified cells, once the results have been normalized for Pt loading, the magnetically modified cells perform better at voltages below 0.6V and at maximum power. At the maximum power, the magnetically modified cells provided 46% and 62% higher power at 70° C. and 25° C., respectively, than nonmagnetic cells.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A self-hydrating membrane electrode assembly (MEA) for fuel cells, wherein said MEA comprises:
   (i) a cathode comprising an electrically conducting material having a cathode catalytic material on a portion of a first surface thereof, said cathode catalytic material comprising a catalytically effective amount of a mixture of at least one catalyst component and at least one ion conducting material to produce cations from a hydrogen-containing fuel supply;
   (ii) an anode comprising an electrically conducting material having an anode catalytic material on a portion of a first surface thereof, said anode catalytic material comprising a catalytically effective amount of a mixture of at least one catalyst component and at least one ion conducting material to produce anions from an oxygen-containing fuel supply; and
   (iii) a separator adjacent to and interposed between said cathode and said anode, said separator comprising an ion conducting material having a first surface and a second surface opposite said first surface, a portion of said first surface is adjacent to and in contact with said first surface of said cathode, and a portion of said second surface is adjacent to and in contact with said first surface of said anode;

wherein a portion of said first surface of said separator contacting said cathode directly contacts the first surface of the cathode without contacting said cathode catalytic material, a portion of said second surface of said separator contacting said anode directly contacts the first surface of the anode without contacting said anode catalytic material, and said portions directly contacting said anode and said cathode without contacting said catalytic materials are opposite each other, thereby providing a portion of said separator that permits water to pass from the cathode side of said separator to the anode side of said separator, and further wherein said cathode produces water in an amount effective to sustain hydration of said anode, wherein said separator comprises a polymer electrolyte membrane, wherein the thickness of said polymer electrolyte membrane is between 1 mil and 7 mils.

2. The self-hydrating membrane electrode assembly MEA of claim 1, wherein said catalyst component comprise at least one member selected from the group consisting of platinum, palladium, nickel, iron, osmium, ruthenium, cobalt, gold, silver, copper, antimony, arsenic, molybdenum, tin, tungsten, alloys comprising one or more thereof, mixtures of two or more of said elements, mixtures of one or more of said elements and one or more alloys comprising one or more of said elements, and mixtures of alloys comprising one or more of said elements.

3. The self-hydrating membrane electrode assembly MEA of claim 2, wherein said catalyst component on said cathode and said catalyst component on said anode are the same.

4. The self-hydrating membrane electrode assembly MEA of claim 2, wherein said catalyst component on said cathode and said catalyst component on anode are not the same.

5. The self-hydrating membrane electrode assembly MEA of claim 1, wherein said ion conducting material comprises a perfluorinated sulfonic acid polymer.

6. The self-hydrating MEA of claim 2, wherein said cathode catalytic material, said anode catalytic material or both further comprises at least one modifying material.

7. The self-hydrating MEA of claim 6, wherein said modifying material affects at least one property of said catalytic material selected from the group consisting of hydrophilicity, hydrophobicity, organophobicity, organophilicity, surface charge, dielectric constant, porosity, gas exclusion, gas permeability, deliquescence, wetting, density, electron conductivity and ionic conductivity.

8. The self-hydrating MEA of claim of claim 6, wherein said modifying material comprises at least one polyalkylene or a derivative thereof.

9. The self-hydrating MEA of claim 8, wherein said polyalkylene is polyethylene.

10. The self-hydrating MEA of claim 8, wherein said derivative is a partially or fully fluorinated polyalkylene.

11. The self-hydrating MEA of claim 2, wherein said cathode catalytic material, said anode catalytic material or both further comprises a plurality of magnetic particles, wherein each of said magnetic particles possesses a magnetic field of sufficient strength to alter the rate of and/or the distribution of products resulting from a chemical reaction involving said particle or occurring within the vicinity of said particle.

12. The self-hydrating MEA of claim 2, wherein said cathode catalytic material, said anode catalytic material or both further comprises a plurality of magnetizable particles, wherein said magnetizable particles have been or are exposed to a magnetic field of sufficient strength for a sufficient time to align the magnetic moments of a portion of atoms at least some of said particles, and further wherein said portion of atoms aligned within each of said particles is sufficient to alter the rate of and or the distribution of products resulting from a chemical reaction involving said particle or occurring within the vicinity of said particle.

13. The self-hydrating MEA of claim 12, wherein said alignment is maintained upon removal of said magnetic field.

14. The self-hydrating MEA of claim 11, 12 or 13, wherein each of said particles comprises a permanent magnetic material.

15. The self-hydrating MEA of claim 11, 12 or 13, wherein each of said particles comprises a paramagnetic material.

16. The self-hydrating MEA of claim 11 or 12, wherein each of said particles comprises a superparamagnetic material.

17. The self-hydrating MEA of claim 11, 12 or 13, wherein each of said particles comprises a ferromagnetic material.

18. The self-hydrating MEA of claim 11, 12 or 13, wherein each of said particles comprises a ferrimagnetic material.

19. The self-hydrating MEA of claim 11, 12 or 13, wherein each of said particles comprises a superconducting material.

20. The self-hydrating MEA of claim 11, 12 or 13, wherein each of said particles comprises an anti-ferromagnetic material.

21. The self-hydrating MEA of claim 11, 12 or 13, wherein said chemical reaction involves transfer of at least one subatomic particle.

22. The self-hydrating MEA of claim 11, 12 or 13, wherein said subatomic particle is selected from the group consisting of protons and electrons.

23. The self-hydrating MEA of 11, 12 or 13, wherein each of said particles has a diameter of about 0.1 microns to about 50 microns.

24. The self-hydrating MEA of claim 11, 12 or 13, wherein each of said particles comprises at least one element selected from the group consisting of samarium, neodymium, iron, boron, lithium, manganese, nickel, cobalt and zinc.

25. The self-hydrating MEA of claim 11, 12 or 13, wherein each of said particles has at least one coating layer on at least a portion of the surface thereof.

26. The self-hydrating MEA of claim 25, wherein said coating layer comprises at least one inert material.

27. The self-hydrating MEA of claim 26, wherein said inert material comprises a silane or a silicon dioxide or a mixture thereof.

28. The self-hydrating MEA of claim 25, wherein said coating layer comprises at least one modifying material.

29. The self-hydrating MEA of claim 28, wherein said modifying material comprises at least one polymer.

30. The self-hydrating MEA of claim 29, wherein said polymer renders said particle chemically inert and/or mechanically stable.

31. The self-hydrating MEA of claim 28, wherein said modifying material affects at least one property of said particle selected from the group consisting of hydrophilicity, hydrophobicity, organophobicity, organophilicity, surface charge, dielectric constant, porosity, gas exclusion, gas permeability, deliquescence, wetting, density, electron conductivity and ionic conductivity.

32. The self-hydrating MEA of claim 28, wherein said modifying material is selected from the group consisting of homopolymers formed from the following monomers: styrene, styrene derivatives, 2-hydroxyethyl acrylate, 2-hydroxyethyl methacrylate, iso-decyl methacrylate, methyl methacrylate, methyl acrylate, vinyl acetate, ethylene glycol, ethylene, 1,3-dienes, vinyl halides, and vinyl esters.

33. The self-hydrating MEA of claim 28, wherein said modifying material is selected from the group consisting of copolymers formed from at least one Monomer A and at least one Monomer B, wherein said Monomer A is selected from the group consisting of styrene, methyl acrylate, iso-decyl methacrylate, 2-hydroxyethyl acrylate, and 2-hydroxyethyl methacrylate and said Monomer B is selected from the group consisting of 4-styrenesulfonic acid and ethylene glycol dimethacrylate.

34. The self-hydrating MEA of claim 25, wherein each of said particles has a plurality of coating layers.

35. The self-hydrating MEA of claim 28, wherein each of said particles has a plurality of coating layers.

36. The self-hydrating MEA of claim 35, wherein at least one of said plurality of coating layers comprises an inert material.

37. The self-hydrating MEA of claim 12, wherein said magnetic particle comprises at least one material selected from the group consisting of samarium cobalt, neodymium-iron-boron, iron and iron oxide, cobalt, misch metal, and ceramic magnets comprising barium ferrite and/or strontium ferrite.

38. The self-hydrating membrane electrode assembly (MEA) of claim 1, wherein said polymer electrolyte membrane comprises at least one perfluorinated sulfonic acid polymer.

39. The self-hydrating MEA of claim 1, wherein said polymer electrolyte membrane has been subjected to at least one modifying process.

40. The self-hydrating MEA of claim 39, wherein said modifying process affects at least one property of said membrane selected from the group consisting of hydrophilicity, hydrophobicity, organophobicity, organophilicity, surface charge, dielectric constant, porosity, gas exclusion, gas permeability, deliquescence, wetting, density, electron conductivity and ionic conductivity.

41. The self-hydrating MEA of claim 39, wherein said modifying process enhances hydration of said membrane.

42. The self-hydrating MEA of claim 39, wherein said modifying process reduces the thickness of said membrane.

43. The self-hydrating MEA of claim 41 or 42, wherein said modifying process comprises contacting said membrane with an acidic solution at elevated temperature for a sufficient period of time.

44. The self-hydrating MEA of claim 43, wherein said acidic solution is at a temperature above ambient temperature.

45. The self-hydrating MEA of claim 44, wherein said acidic solution comprises a sulfuric acid solution.

46. The self-hydrating membrane electrode assembly (MEA) of claim 1, wherein the thickness of said polymer electrolyte membrane is about 2 mils.

47. The self-hydrating membrane electrode assembly (MEA) of claim 1, wherein the thickness of said polymer electrolyte membrane is about 1 mil.

48. The self-hydrating membrane electrode assembly (MEA) of claim 11 or 12, wherein said chemical reaction involves the flux of a solute.

49. The self-hydrating MEA of claim 11 or 12, wherein said chemical reaction involves mass transport.

50. The self-hydrating membrane electrode assembly (MEA) of claim 2, wherein said catalytic component is present in an amount between 0.1 and 0.8 mg/cm$^2$.

51. The self-hydrating MEA of claim 37, wherein said catalytic component is present in an amount of about 0.4 mg/cm$^2$.

52. The self-hydrating MEA of claim 11 or 12, wherein said particles are present in an amount between 0.1 and 0.8 mg/cm$^2$.

53. The self-hydrating MEA of claim 37, wherein said particles are present in an amount of about 0.4 mg/cm$^2$.

54. The self-hydrating MEA of claim 11 or 12, wherein said particles are present in said catalytic material on said cathode and said catalytic material on said anode.

55. The self-hydrating MEA of claim 11 or 12, wherein said particles are present only in said catalytic material on said cathode.

56. The self-hydrating MEA of claim 11 or 12, wherein said particles are present only in said catalytic material on said anode.

57. The self-hydrating MEA of claim 54, wherein said particles present in said catalytic material on said cathode are the same as said particles present in said catalytic material on said anode.

58. The self-hydrating MEA of claim 54, wherein said particles present in said catalytic material on said cathode are not the same as said particles present in said catalytic material on said anode.

59. The self-hydrating MEA of claim 1, further comprising (iv) a gasket or seal adjacent to and in substantial contact with said separator and that portion of said surface of said cathode and/or said anode that does not have said catalytic material thereon.

60. The self-hydrating MEA of claim 59, wherein the ratio of the external periphery of said gasket or seal to the internal periphery thereof to the length of an edge of said catalytic material on said first surface of said cathode is about 3:about 2:about 1.

61. The self-hydrating MEA of claim 59, wherein said gasket or seal contacts an edge of said cathode catalytic material, said anode catalytic material or both.

62. The self-hydrating MEA of claim 59, wherein said gasket or seal is in substantial contact with said separator and said cathode.

63. The self-hydrating MEA of claim 59, wherein said gasket or seal is in substantial contact with said separator and said anode.

64. The self-hydrating MEA of claim 59, wherein said gasket or seal is in substantial contact with said separator and said anode and said cathode.

65. The self-hydrating MEA of claim 59, wherein said gasket or seal comprises a polymer.

66. The self-hydrating MEA of claim 65, wherein said polymer comprises at least one member of the group consisting of fluoroelastomers, partially or fully fluorinated polyalkanes and natural and synthetic rubbers.

67. The self-hydrating membrane electrode assembly (MEA) of claim 1, wherein the ion conducting material comprises one or more charge carriers.

68. The self-hydrating membrane electrode assembly (MEA) of claim 1, wherein the ion conducting material comprises one or more ionic groups.

69. The self-hydrating membrane electrode assembly (MEA) of claim 1, wherein the cathode and anode catalytic materials each comprise an admixture of said at least one catalyst components and said at least one ion conducting materials.

* * * * *

UNITED STATES PATENT AND TRADEMARK OFFICE
CERTIFICATE OF CORRECTION

PATENT NO.      : 8,227,134 B2                                         Page 1 of 1
APPLICATION NO. : 10/684802
DATED           : July 24, 2012
INVENTOR(S)     : Johna Leddy et al.

It is certified that error appears in the above-identified patent and that said Letters Patent is hereby corrected as shown below:

IN THE SPECIFICATION:

Column 1, line 4, please add:

--STATEMENT REGARDING FEDERALLY SPONSORED RESEARCH OR DEVELOPMENT

This invention was made with government support under DAAD19-02-1-0443 awarded by Army Research Office. The Government has certain rights in the invention.--

Signed and Sealed this
Sixth Day of November, 2012

David J. Kappos
*Director of the United States Patent and Trademark Office*